United States Patent
Shalita et al.

(10) Patent No.: US 9,860,316 B2
(45) Date of Patent: Jan. 2, 2018

(54) ROUTING NETWORK TRAFFIC BASED ON SOCIAL INFORMATION

(71) Applicant: Facebook, Inc., Menlo Park, CA (US)

(72) Inventors: Alon Michael Shalita, Menlo Park, CA (US); Igor Kabiljo, Palo Alto, CA (US); Kenneth Lau, Campbell, CA (US); Arun Dattaram Sharma, Union City, CA (US); Alexander Michael Laslavic, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 179 days.

(21) Appl. No.: 14/491,771

(22) Filed: Sep. 19, 2014

(65) Prior Publication Data

US 2016/0087880 A1   Mar. 24, 2016

(51) Int. Cl.
*G06F 15/167* (2006.01)
*H04L 29/08* (2006.01)
*H04L 12/725* (2013.01)

(52) U.S. Cl.
CPC ...... *H04L 67/1097* (2013.01); *H04L 67/1021* (2013.01); *H04L 67/2842* (2013.01); *H04L 45/306* (2013.01)

(58) Field of Classification Search
CPC ......... G06F 17/30628; G06F 17/30132; G06F 17/3033; G06F 17/3048; G06F 17/30598; G06F 17/30902; G06Q 50/01; H04L 67/2842; H04L 45/306; H04L 67/306
USPC ............... 709/204, 206, 208, 215, 220, 222; 707/711, 737, 741, 747, 756
See application file for complete search history.

(56) References Cited

U.S. PATENT DOCUMENTS

| | | | |
|---|---|---|---|
| 5,835,085 A | 11/1998 | Eick et al. | |
| 5,970,495 A | 10/1999 | Baru et al. | |
| 6,437,804 B1 | 8/2002 | Ibe et al. | |
| 8,065,090 B2 | 11/2011 | Fitch et al. | |
| 8,539,197 B1 | 9/2013 | Marshall et al. | |
| 9,083,757 B2 | 7/2015 | Li et al. | |
| 2006/0015588 A1* | 1/2006 | Achlioptas | G06Q 30/02 709/220 |

(Continued)

OTHER PUBLICATIONS

European Search Report dated May 4, 2015, for European Patent Application No. 13193398.8, 3 pages.

(Continued)

*Primary Examiner* — Dustin Nguyen
*Assistant Examiner* — Hao Nguyen
(74) *Attorney, Agent, or Firm* — Perkins Coie LLP

(57) ABSTRACT

A technology for routing traffic from similar users to a same server cluster to improve data center efficiency is disclosed. When a traffic routing server receives a request from a user, the traffic routing server determines an identifier of a partition to which the user is assigned. The user and many other users with whom the user shares a social attribute are co-located in the same partition. The traffic routing server then computes a hash of the identifier using a hash function and locates a server cluster on a consistent hash ring using the computed hash. The traffic routing server then sends the request from the user to that server cluster. By consistently sending requests from users assigned to the same partition to the same server cluster, the technology improves cache hit rates and reduces data duplication across the server clusters, which in turn improves datacenter efficiency.

20 Claims, 8 Drawing Sheets

(56) References Cited

U.S. PATENT DOCUMENTS

| | | | |
|---|---|---|---|
| 2008/0189093 A1 | 8/2008 | Fitch et al. | |
| 2010/0313205 A1 | 12/2010 | Shao et al. | |
| 2010/0325127 A1* | 12/2010 | Chaudhuri | G06F 17/30528 707/759 |
| 2010/0332476 A1 | 12/2010 | Buehrer et al. | |
| 2011/0029887 A1 | 2/2011 | Pearson et al. | |
| 2011/0196855 A1* | 8/2011 | Wable | G06F 17/30631 707/711 |
| 2011/0208824 A1 | 8/2011 | Lidström et al. | |
| 2011/0212783 A1 | 9/2011 | Dale et al. | |
| 2011/0276649 A1 | 11/2011 | Pujol et al. | |
| 2012/0158858 A1 | 6/2012 | Gkantsidis et al. | |
| 2012/0173541 A1* | 7/2012 | Venkataramani | G06F 17/3048 707/747 |
| 2012/0197834 A1 | 8/2012 | Panigrahy et al. | |
| 2012/0310959 A1 | 12/2012 | Huhn | |
| 2013/0073552 A1 | 3/2013 | Rangwala et al. | |
| 2013/0108263 A1 | 5/2013 | Srinivas et al. | |
| 2013/0124809 A1 | 5/2013 | DeJana et al. | |
| 2013/0145099 A1* | 6/2013 | Liu | H04L 67/2842 711/133 |
| 2013/0151683 A1 | 6/2013 | Jain et al. | |
| 2014/0114950 A1 | 4/2014 | Halverson et al. | |
| 2014/0149418 A1 | 5/2014 | Qin et al. | |
| 2014/0244335 A1 | 8/2014 | Baldwin et al. | |
| 2014/0320497 A1 | 10/2014 | Vojnovic et al. | |
| 2015/0095348 A1* | 4/2015 | Presta | G06F 17/30958 707/748 |
| 2017/0272983 A1* | 9/2017 | Oyman | H04W 74/0833 |

OTHER PUBLICATIONS

Final Office Action dated Mar. 10, 2016, for U.S. Appl. No. 14/043,730 of Presta, A., filed Oct. 3, 2013.
Non-Final Office Action dated Jul. 30, 2015, for U.S. Appl. No. 14/043,730 of Presta, A., filed Oct. 3, 2013.
International Search Report and Written Opinion of International Application No. PCT/US2013/071087, dated Jul. 7, 2014, 13 pages.
U.S. Appl. No. 14/043,730 of Presta, A., filed Oct. 3, 2013.
Ugander, Johan et al., "Balanced Label Propagation for Partitioning Massive Graphs," Proceedings of the Sixth ACM International Conference on Web Search and Data Mining (WSDM '13), pp. 507-516, Feb. 4, 2013.
Final Office Action dated Mar. 8, 2017, for U.S. Appl. No. 14/043,730 of Presta, A., filed Oct. 1, 2013.
Non-Final Office Action dated Sep. 14, 2016, for U.S. Appl. No. 14/043,730 of Presta, A., filed Oct. 3, 2013.
Advisory Action dated May 15, 2017, for U.S. Appl. No. 14/043,730 of Presta, A., filed Oct. 1, 2013.

* cited by examiner

ROUTING NETWORK TRAFFIC BASED ON
SOCIAL INFORMATION

BACKGROUND

Social networking services are accessed by users to communicate with each other, share their interests, upload images and videos, create new relationships, etc. Social networking services typically operate in a distributed computing environment with data being distributed among one or more server clusters that are each located in one of multiple data centers. A server cluster is a grouping of server computing devices ("servers"). When a user of a social networking service sends a query to request data of his or her friends, a load balancing server can be the first server to receive the request. The load balancing server usually routes the request to any server that has a low load to balance the load across the server clusters. A server in the server cluster receiving the query first attempts to fetch the requested data from a cache. If requested data is not cached, it is fetched from one or more databases. As the load balancing server routes queries based solely on load constraints, queries from (or pertaining to) the same user can end up being routed to different server clusters. This random routing of queries is inefficient because each time a query is routed to a different server cluster, there is a high likelihood that the requested data will not be cached, leading to a "cache miss." Consequently, the requested data will need to be fetched using the more operationally expensive database queries. A high frequency of fetching data using database queries can lead to increased latency, e.g., because the data is not cached. Moreover, as the queries of the same user are routed to different server clusters, the same data can eventually be cached in multiple server clusters. This duplication of cached data is also inefficient.

One way to increase "cache hits" (i.e., fetch data from a cache instead of database queries) is by routing network traffic ("traffic") from the same user to the same cluster every time. However, because of load constraints, it can lead to inefficiency. For example, if a server cluster assigned to a user is overloaded, even if cached data requested by the user is available, there would be increased latency in fetching that cached data.

DETAILED DESCRIPTION

Figure 1:
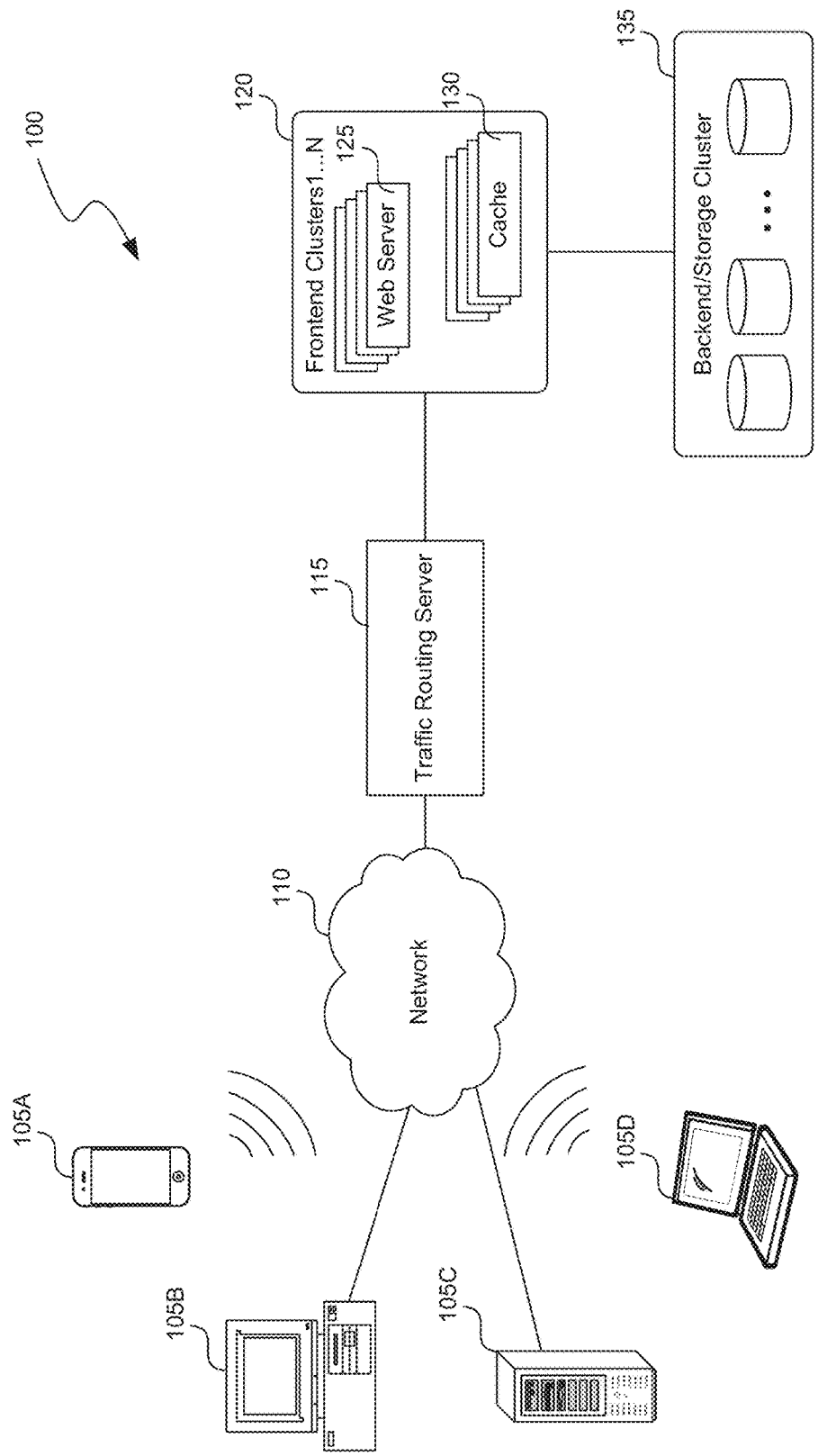
FIG. 1 is a block diagram illustrating an overview of an example environment in which some embodiments of the disclosed technology for routing traffic to clusters based on social information may operate.

A technology for routing network traffic ("traffic") to frontend clusters based on social information is disclosed herein. A social networking service employing the disclosed technology caches data of entities (e.g., users) with common social attributes (e.g., friends) on the same frontend cluster (e.g., on one or more servers). The social networking service then uses a "consistent hash ring" to route requests of users to the frontend cluster that has the cached data. Doing so increases the cache hit rate, as a request of one user can be fulfilled using cache elements of other users with whom the user shares a common social attribute. For example, consider a request of a user that requires fetching data about all of the friends of the user. When the request of the user is routed to a frontend cluster that caches data about the user and many of his or her friends, at least some of the requested data can be fetched from the cache, as the cache is likely to have cache elements of the user's friends. This improves the cache hit rate and reduces the load imposed on the databases due to a cache miss. Moreover, the disclosed technology also reduces data duplication across different clusters as data about users with common social attributes can be stored in the cache of one frontend cluster instead of multiple caches. In addition to improving a cache hit rate and reducing data duplication, the disclosed technology also reduces network traffic between the servers, clusters, and data centers, thereby improving the efficiency of data centers.

In some embodiments, to determine which frontend cluster (or server) has cached data for a particular user, each data center stores a table that maps users to "buckets." Each bucket has a bucket identifier and includes a segment of the user population that is similar (e.g., similar users can have a common social attribute). For example, a bucket can include a user and most of his or her friends. The user-to-bucket mapping and a consistent hash ring are used by a traffic routing server (e.g., a "load balancer") to route similar users to the same frontend cluster. The consistent hash ring is partitioned into a number of ring segments based on the number of available clusters (or servers). The traffic routing server hashes a bucket identifier associated with a request and uses the hash to locate a segment on the ring. The traffic routing server then routes the request to the frontend cluster corresponding to the located segment on the consistent hash ring.

Various embodiments and implementations of the disclosed technology will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed technology.

FIG. 1 is a block diagram illustrating an overview of an example distributed environment 100 in which some embodiments of the disclosed technology may operate. The environment 100 includes one or more client computing devices 105A-D. Client computing devices 105A-D may operate in a networked environment using logical connections to one or more remote computers or web servers 125 in frontend clusters 120 through network. Requests from users typically reach a traffic routing server 115 first. The traffic routing server 115, in some embodiments, can be a customized load balancing server that monitors loads on different frontend clusters 120. In some embodiments, the traffic routing server 115 resides in a "point of presence" outside the data centers. Instead of making traffic routing decisions randomly or based solely on load constraints, the traffic routing server 115 routes traffic based on social information. For example, the traffic routing server 115 routes traffic from similar users to the same frontend cluster while respecting load constraints to achieve improved cache hit rates without putting excessive load on the frontend clusters.

As illustrated, the environment 100 includes multiple frontend clusters 120. The frontend clusters 120 may be located in the same data center or in a different data center (not shown) in another geographic location. Each frontend cluster can include a number of web servers 125 and a caching layer 130. The caching layer 130 can include memcached servers, caching servers, and/or distributed data stores having a tier of caching servers, for example, that cache recently used data. Memcached is an efficient mechanism for storing shared data. The frontend clusters 120 are connected to backend or storage clusters 135. Each backend cluster 135 includes databases that store data in a persistent manner. As illustrated, each frontend cluster 120 is an autonomous unit including the web servers 125 tied to the caching layer 130. Thus, once a frontend cluster is selected, the caching layer or cache cluster is also selected. Data that is cached in a caching layer of a frontend cluster can thus be used to serve web requests from that same frontend cluster.

It should be noted that the term "server" as used throughout this application refers generally to a computer, other device, program, or combination thereof that processes and responds to requests (e.g., from remote users using client computing devices across a network 110, from other servers). Servers serve their information to requesting "clients." The term "client" as used herein refers generally to a computer, program, other device, user and/or combination thereof that is capable of processing and making requests and obtaining and processing any responses from servers across a network. Client computing devices and server computing devices may each act as a server or client to other server/client devices. Network 110 can be a local area network (LAN) or a wide area network (WAN), but may also be other wired or wireless networks. The client computing devices 105A-D can be connected to network 110 through a network interface, such as by a wired or wireless network.

Figure 2:
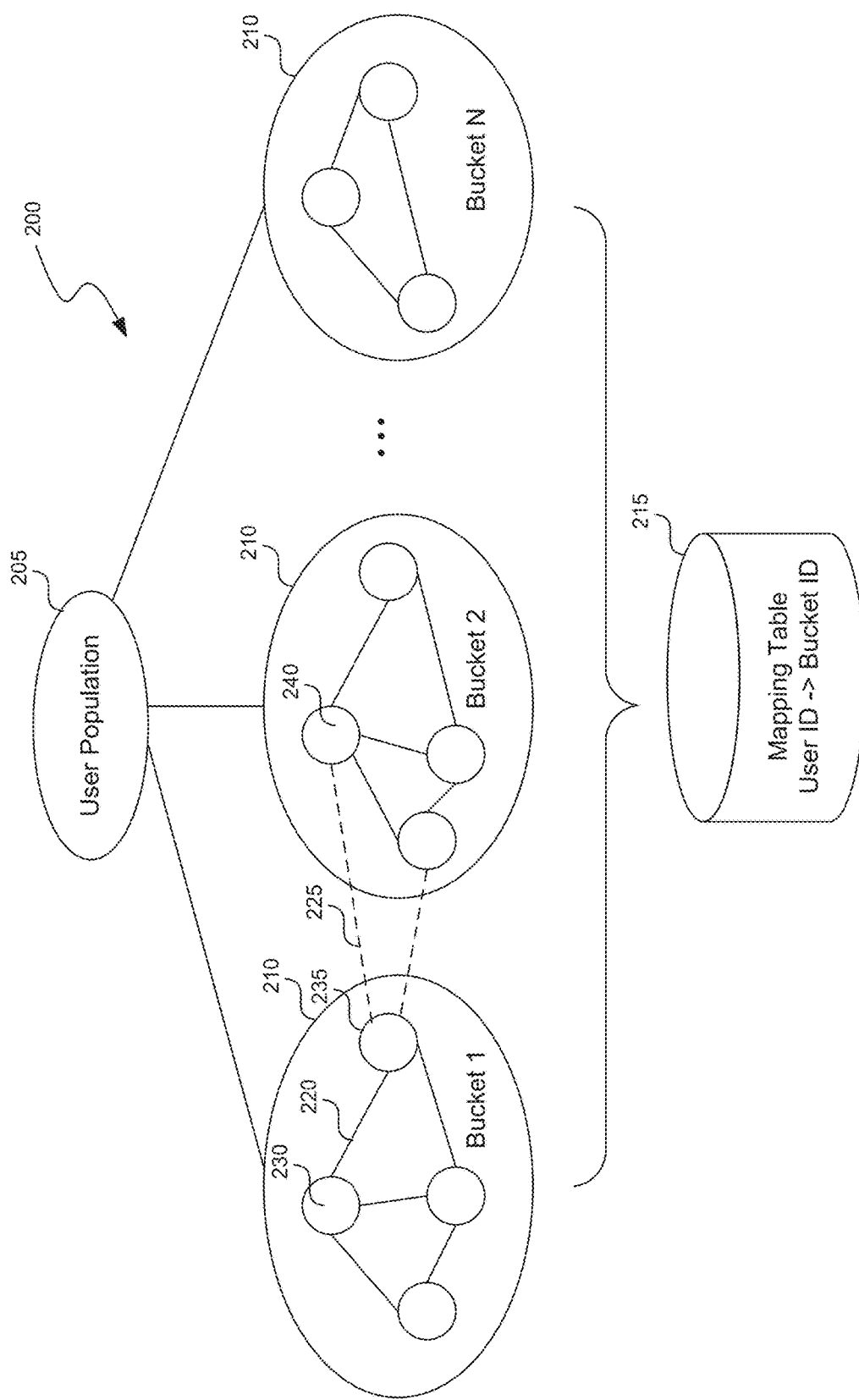
FIG. 2 is a block diagram illustrating partitioning of user population having common social attributes into buckets in some embodiments of the disclosed technology.

FIG. 2 is a block diagram illustrating partitioning of user population having common social attributes into buckets in some embodiments of the disclosed technology. As illustrated, the user population 205 (e.g., of a social networking service) can be partitioned into a number of buckets in such a way that more edges (e.g., friendship edges) connecting users are "local" or within a bucket than across buckets. Each edge can represent a common attribute between users (e.g., friendship, city of residence, home town, interests, page likes, etc.). For example, a 50% edge locality means that a user is assigned to the same bucket as 50% of his or her friends on average.

In the diagram 200, the user population 205 is partitioned into N buckets or partitions 210. The number of buckets or partitions can depend on the size of the population. In some embodiments, for a social networking service having a large number of users, the number of buckets can be also be high, with each bucket having a certain number of users. A large number of buckets helps keep the weight of a bucket (i.e., the number of users assigned to the bucket) down. So when the traffic needed to be rebalanced (e.g., due a cluster failure or other reasons), only a small number of users need to be migrated to another frontend cluster.

As illustrated, bucket 1 includes a user 230 who is connected to another user 235 in the same bucket via an edge 220. Similarly, the user 235 in bucket 1 is connected to another user 240 in bucket 2 via an edge 225. In this example scenario, there are more edges that are local in bucket 1 than across buckets 1 and 2. In this manner, users who are similar (e.g., have a common social attribute) are assigned to the same bucket. The mapping between the users (e.g., user identifiers) and their assigned buckets (e.g., bucket identifiers) are stored in a mapping table 215. The mapping of users to partitions or buckets can be performed using a technology for partitioning a node graph across multiple servers or a data center disclosed in co-pending application Ser. No. 14/043,730 titled "Systems and Methods For Dynamic Mapping for Locating and Balance," which is expressly incorporated by reference herein.

Figure 3:
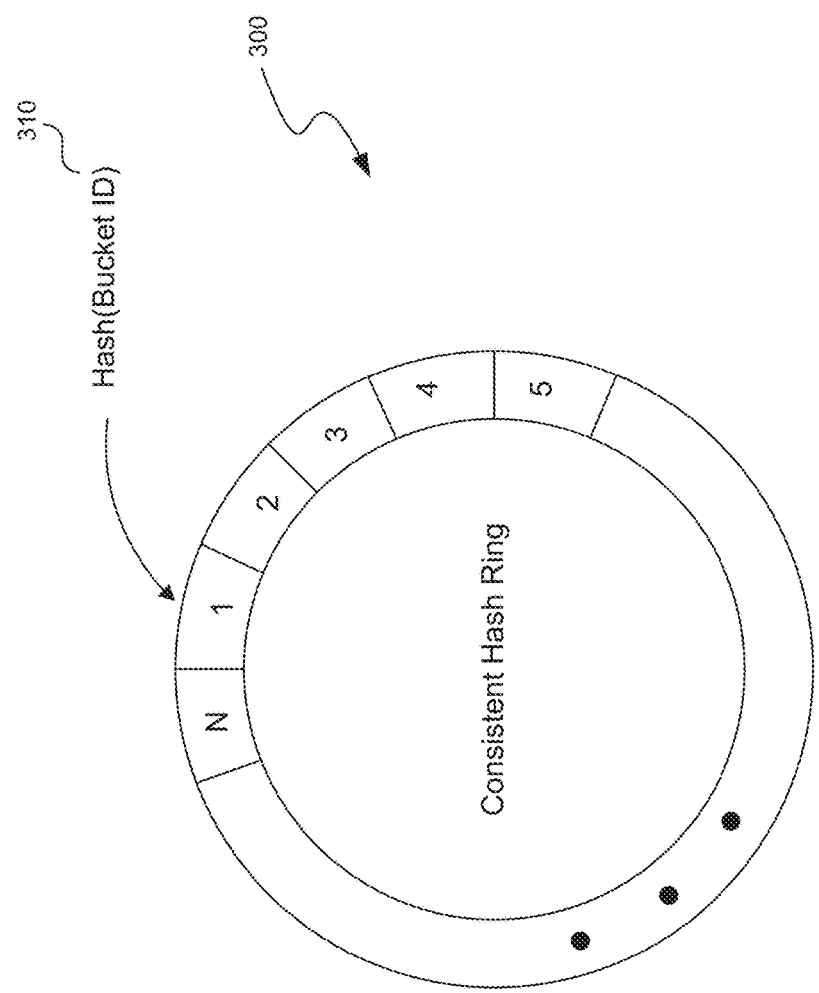
FIG. 3 is a block diagram illustrating a consistent hash ring for locating a cluster to which a data request associated with a bucket identifier should be routed to improve a cache hit rate in some embodiments of the disclosed technology.

FIG. 3 is a block diagram illustrating a consistent hash ring for locating a cluster to which a data request associated with a bucket identifier should be routed to improve a cache hit rate in some embodiments of the disclosed technology.

A consistent hash ring 300 maps each bucket identifier to a frontend cluster or node. The consistent hash ring 300 is an ordered ring of values of a n-bit hash (e.g., n is 64, 128) and is partitioned into a number of segments N based on the number of frontend clusters. To decide where to send a request, the traffic routing server 115 computes a hash 310 of a bucket identifier associated with the request using a hash function. The computed hash corresponds to a point in the hash ring and is used to locate a ring segment. The traffic routing server 115 then sends the request to a frontend cluster corresponding to the ring segment.

By bucketing similar users into groups and treating the groups as routing elements, the traffic routing server 115 can route similar users to the same frontend cluster every time. If one of the frontend clusters fails or becomes unreachable, the consistent hash ring enables the traffic routing server 115 to locate another frontend cluster on the ring to route the traffic to, without having to completely reshuffle the user-to-cluster assignment and invalidate the caches on the entire frontend clusters. Similarly, when a load on a frontend cluster is high, the consistent hash ring enables the traffic routing server 115 to locate a neighboring cluster on the ring to route some of the traffic with minimal disruption. Consequently, most users will continue to be routed to a same frontend cluster and very few users will need to migrate to a different cluster.

Figure 4:
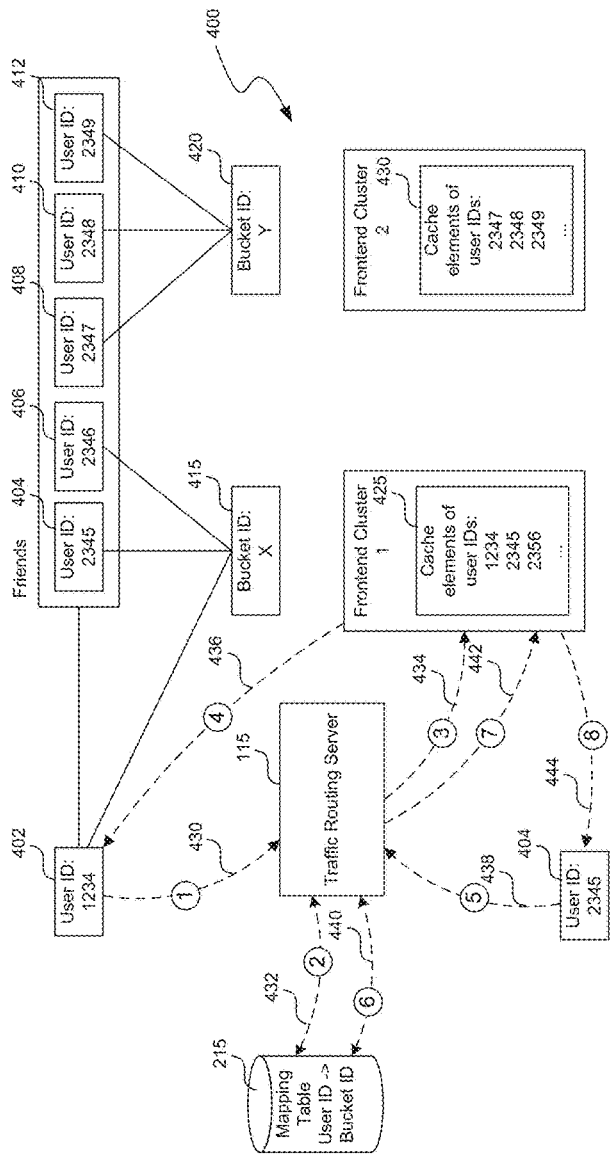
FIG. 4 is a data flow diagram illustrating routing of data requests of similar users to a same cluster to increase cache hits in some embodiments of the disclosed technology.

FIG. 4 is a data flow diagram illustrating routing of data requests of similar users to a same cluster to improve cache hits in some embodiments of the disclosed technology.

As illustrated, a user 402 and users 404-412 share a common social attribute of "friendship." Some of the users (i.e., users 402-406) are assigned to bucket 415 (bucket ID:

X) while other users (i.e., users 408-412) are assigned to a different bucket 420 (bucket ID: Y). The traffic routing server receives a request from the user 402 (user ID: 2345). The request can be, for example, a request for data of the users 404-412. The traffic routing server 115 translates the user ID of the requesting user 402 into a bucket ID by querying the mapping table 215. The traffic routing server 115, using a consistent hash ring, then locates a frontend cluster mapped to a hash of the bucket ID and sends the request to that frontend cluster (i.e., frontend cluster 1). Since the users 402-406 are routed to the same frontend cluster, if any of the users 402-406 had recently logged in to the system, the cache of frontend cluster 1 will have the recent results in memory. A server in the frontend cluster 1 can then respond to the request using cache elements from the cache. If the cache has no data or incomplete data, the server in the frontend cluster 1 can query database servers in the backend to fetch the requested or missing data. The data that is fetched is cached in the caching layer of the frontend cluster 1 so that subsequent requests can be fulfilled using data from the cache. The server in the frontend cluster 1 can then aggregate and send the requested data to the user 402.

Similarly, the traffic routing server 115 can subsequently receive a request from the user 404. The traffic routing server 115 determines a bucket ID corresponding to the user ID and hashes the bucket ID on the consistent hash ring to determine a frontend cluster that the data request should be directed to. The user 404 being on the same bucket as the user 402, is directed to the same frontend cluster 1. As the caching layer of the frontend cluster already has data of the users 402-406, a server in the frontend cluster 1 can use the cached data to respond to the data request. By co-locating users 402 and 404 that share a common attribute to the same frontend cluster, the cache hit rate is thus improved, the frequency of backend queries is decreased and data duplication is also reduced.

Figure 5:
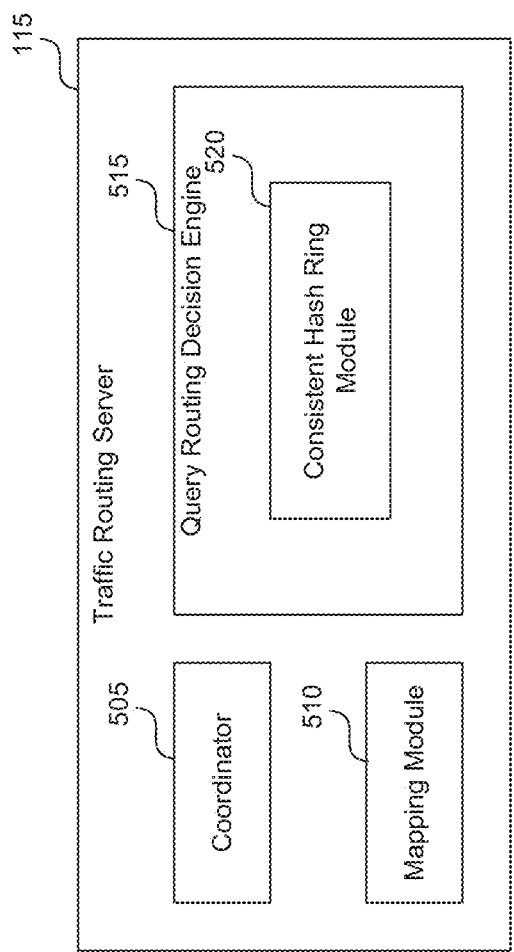
FIG. 5 is a block diagram illustrating example components of a traffic routing server in some embodiments of the disclosed technology.

FIG. 5 is a block diagram illustrating example components of a traffic routing server 115 in some embodiments of the disclosed technology.

The traffic routing server 115 in some embodiments can include a coordinator 505, a mapping module 510 and a query routing decision engine 515. The coordinator 505 receives requests (e.g., query requests or data requests) of users from client devices and can parse the requests to extract information contained in the requests. For example, the coordinator 505 can extract a user identifier, a device identifier, a session identifier and/or an Internet Protocol (IP) address from a request. In some embodiments, the mapping module 510 uses an identifier (e.g., user identifier) extracted from a request to query a mapping table to obtain a bucket identifier mapped to the user identifier. The query routing decision engine 515 includes a consistent hash ring module 520 that hashes a bucket identifier on a consistent hash ring of frontend clusters to determine a name or IP address of a frontend cluster to which the request is to be routed to increase a cache hit rate.

Figure 6:
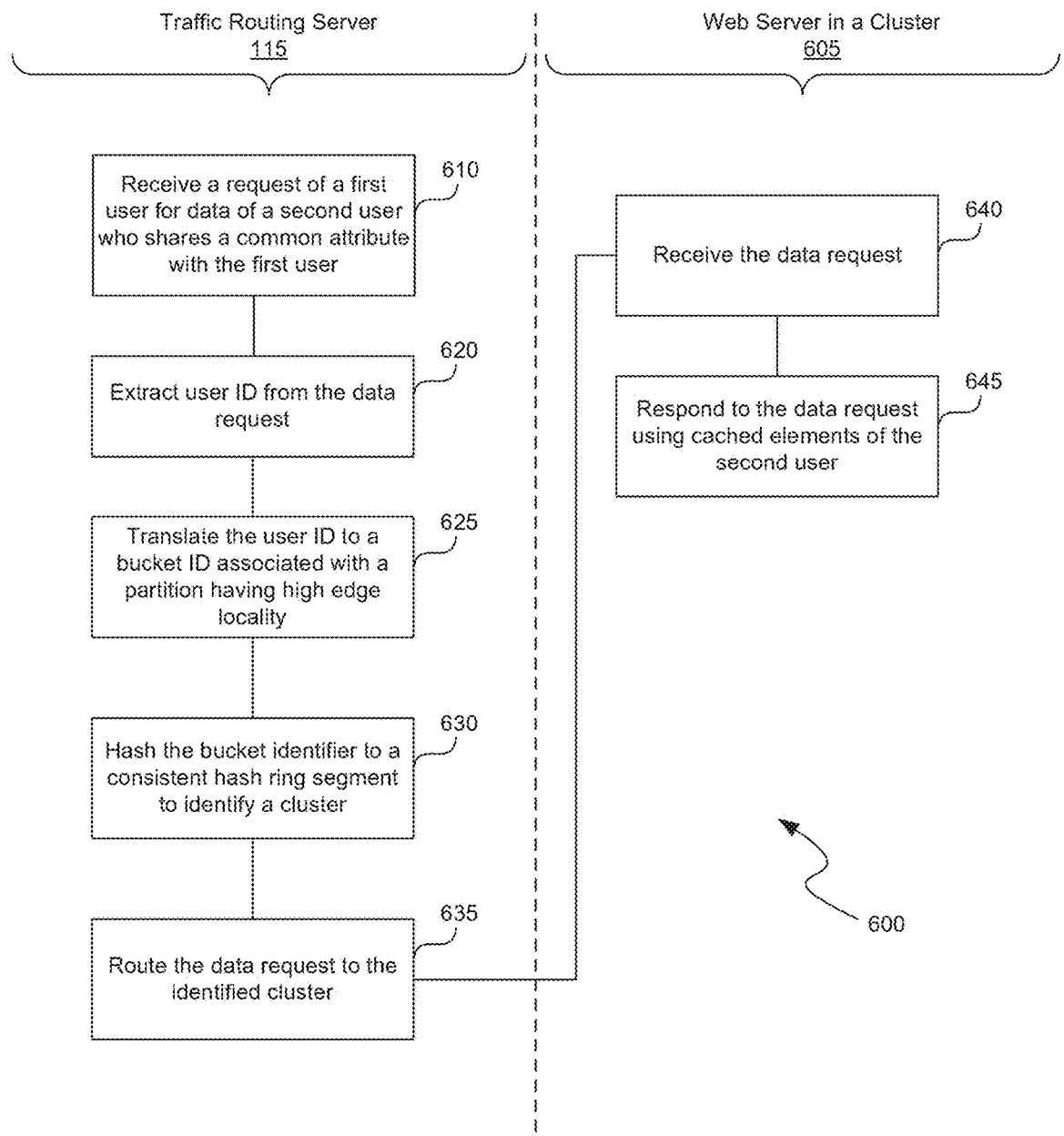
FIG. 6 is a logic flow diagram illustrating an example method of routing data requests from similar users to a same cluster to improve cache hit rates in some embodiments of the disclosed technology.

FIG. 6 is a logic flow diagram illustrating an example method 600 of routing requests from similar users to a same cluster to use each other's preloaded cache elements in responding to the requests in some embodiments of the disclosed technology.

The traffic routing server 115 receives a request of a first user for data of a second user who shares a common attribute with the first user at block 610. The traffic routing server 115 then parses the data request to extract a user identifier associated with the first user at block 620. At block 625, the traffic routing server 115 translates the user identifier to a bucket identifier. The bucket identifier is associated with a partition with more local edges within the partition than across partitions. The mapping between the first user and bucket identifier is stored in a mapping table 215.

At block 630, the traffic routing server 115 hashes the bucket identifier to a point in a consistent hash ring to identify a frontend cluster having cached data associated with users mapped to the bucket identifier. The traffic routing server 115 then routes the request to the identified cluster at block 635. A web server in the identified cluster 605 then receives the request at block 640. As the cluster 605 has the cached data associated with users mapped to the same bucket identifier, the web server responds to the request using data from the cache at block 645.

Figure 7:
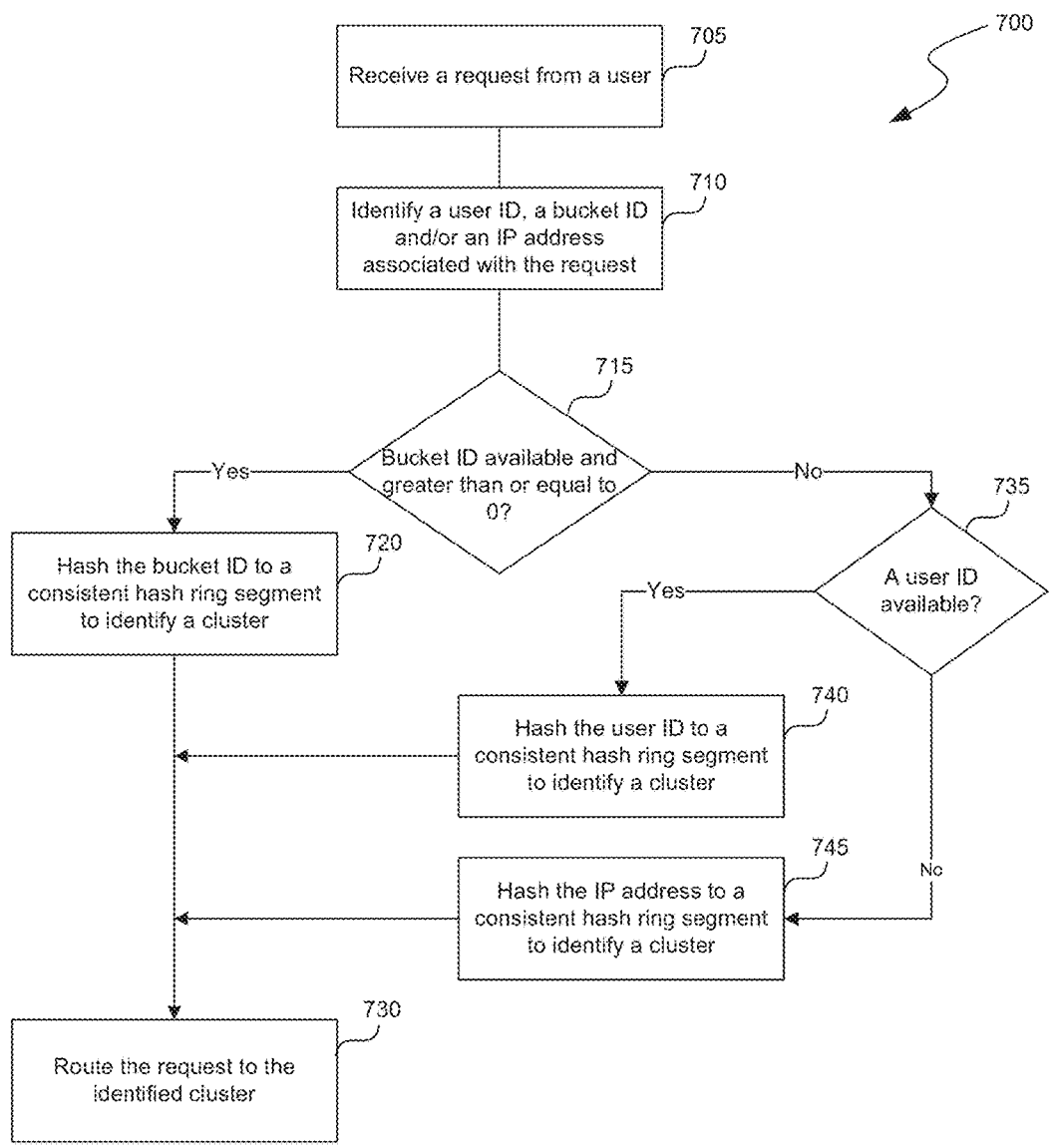
FIG. 7 is a logic flow diagram illustrating an example method of determining where to route a data request based on an identifier in the data request in some embodiments of the disclosed technology.

FIG. 7 is a logic flow diagram illustrating an example method 700 of determining where to route a request based on an identifier in the request in some embodiments of the disclosed technology.

At block 705, the traffic routing server 115 receives a request from a user. At block 710, the traffic routing server 115 identifies a user identifier, a bucket identifier and/or an IP address associated with the request. At block 715, the traffic routing server 115 determines if a bucket identifier is available and if the bucket identifier is greater than or equal to zero. If true, at block 720, the traffic routing server 115 hashes the bucket identifier to a consistent hash ring segment to obtain a name of the frontend cluster to which the request is to be routed. At block 730, the traffic routing server 115 then routes the request from the user to the identified frontend cluster so that a web server in that frontend cluster can respond to the data request using data from the cache in the frontend cluster.

When a bucket identifier is not available or the bucket identifier is not greater than or equal to 0, at decision block 735, the traffic routing server 115 determines if a user identifier associated with the request is available. If true, the traffic routing server 115 hashes the user identifier to a consistent hash ring segment to determine a name or other identifier (e.g., the IP address) of a frontend cluster which is likely to have cached data associated with users similar to the requesting user. If a user identifier is not available, the traffic routing server can hash an IP address to a consistent hash ring segment to identify a frontend cluster at block 745. The traffic routing server 115 can then route the request to the identified frontend cluster to improve a cache hit rate.

Figure 8:
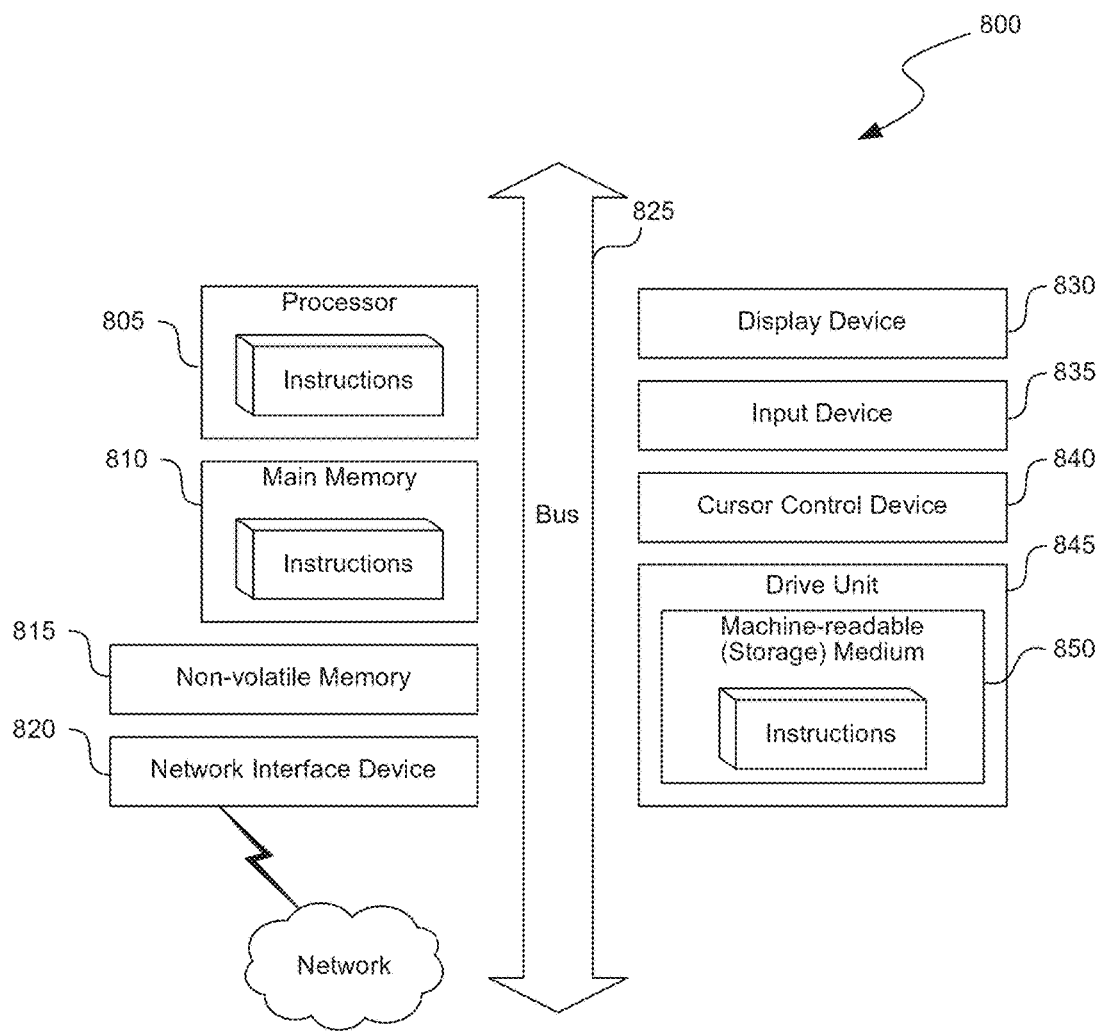
FIG. 8 is a block diagram illustrating a diagrammatic representation of a computer system within which a set of instructions, for causing the computer system to perform any one or more of the methodologies discussed herein, can be executed.

FIG. 8 shows a diagrammatic representation of a computer system 800 on which the embodiments of the present disclosure can be implemented. For example, the traffic routing server 115, the web server 125, caching servers, database servers and client devices 105A-D can be implemented on the computer system 800.

The computer system 800 generally includes a processor 805, main memory 810, non-volatile memory 815, and a network interface device 820. Various common components (e.g., cache memory) are omitted for illustrative simplicity. The computer system 800 is intended to illustrate a hardware device on which any of the components depicted in the example of FIGS. 1, 4 and 5 (and any other components described in this specification) and methods described in the example of FIGS. 6-7 can be implemented. The computer system 800 can be of any applicable known or convenient type. The components of the computer system 800 can be coupled together via a bus 825 or through some other known or convenient device.

The processor 805 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 810 is coupled to the processor 805 by, for example, a bus 825 such as a PCI bus, SCSI bus, or the like. The memory 810 can include, by way of example but not limitation, random access memory (RAM), such as dynamic RAM (DRAM) and static RAM (SRAM). The memory 810 can be local, remote, or distributed.

The bus 825 also couples the processor 805 to the non-volatile memory 815 and drive unit. The non-volatile memory 815 is often a magnetic floppy or hard disk, a magnetic-optical disk, an optical disk, a read-only memory (ROM), such as a CD-ROM, EPROM, or EEPROM, a magnetic or optical card, SD card, or another form of storage for large amounts of data. Some of this data is often written, by a direct memory access process, into memory during execution of software in the computer system 800. The non-volatile memory 815 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 815 and/or the drive unit 845. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 810 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 825 also couples the processor to the network interface device 820. The interface can include one or more of a modem or network interface. It will be appreciated that a modem or network interface can be considered to be part of the computer system 800. The interface can include an analog modem, isdn modem, cable modem, token ring interface, satellite transmission interface (e.g., "direct PC"), or other interfaces for coupling a computer system to other computer systems. The interface can include one or more input and/or output devices 835. The I/O devices can include, by way of example but not limitation, a keyboard, a mouse or other pointing device, disk drives, printers, a scanner, speaker, DVD/CD-ROM drives, disk drives, and other input and/or output devices, including a display device. The display device 830 can include, by way of example but not limitation, a cathode ray tube (CRT), liquid crystal display (LCD), LED display, a projected display (such as a heads-up display device), a touchscreen or some other applicable known or convenient display device. The display device 830 can be used to display text and graphics. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 815 and/or drive unit 845 and causes the processor to execute the various acts required by the operating system to input and output data and to store data in the memory, including storing files on the non-volatile memory 815 and/or drive unit 845.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer (e.g., a database server), a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium 850 is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technology. Thus, machine-readable media can include "non-transitory" media, e.g., memory or transitory media, e.g., a signal.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made. Accordingly, the embodiments are not limited except as by the appended claims.

We claim:

1. A method comprising:
   receiving a first request from a first user, the first user being assigned to a bucket, wherein multiple users including the first user have a common social attribute and are assigned to the bucket;
   in response to the first request, locating a point on a hash ring structure based on a bucket identifier of the bucket to which the first user associated with the first request is assigned, wherein the bucket identifier is determined based on a user identifier of the first user received in the first request;
identifying a segment of the hash ring structure that the point belongs to, the segment of the hash ring structure representing a server or a server cluster; and
sending the first request to the server or the server cluster represented by the segment of the hash ring structure, wherein requests from at least some of the multiple users assigned to the bucket are sent to the same server or server cluster.

2. The method of claim 1, wherein locating the point on the hash ring structure further comprises generating a hash value from the identifier of the bucket using a hash function and using the hash value to locate the point on the hash ring structure.

3. The method of claim 1, wherein the hash ring structure is a consistent hash ring.

4. The method of claim 1, wherein sending the requests from at least some of the multiple users assigned to the same bucket to the same server or server cluster increases a cache hit rate associated with the server or server cluster.

5. The method of claim 4, wherein the hash ring structure is a consistent hash ring partitioned into a number of segments based on a number of the servers or the cluster servers.

6. The method of claim 1, wherein the bucket identifier is determined by:
extracting the user identifier from the first request associated with the first user; and
determining from a mapping table, the bucket identifier mapped to the user identifier.

7. The method of claim 1, further comprising:
caching in the server content that is retrieved to fulfil the first request;
receiving a second request from a second user, wherein the multiple users including the first user and the second user have the common social attribute and are assigned to the bucket;
identifying the server based on the hash ring structure and the bucket identifier of the bucket to which the second user is assigned; and
sending the second request to the server; and fulfilling the second request by using the content cached in the server.

8. A non-transitory computer-readable storage medium storing instructions, comprising:
instructions for receiving a request from a user;
instructions for determining, for the request, a bucket identifier of a bucket to which the user associated with the request is assigned, wherein the bucket identifier is determined based on a user identifier of the user received in the request, wherein the bucket co-locates the user with at least some of other users with whom the user shares a social attribute;
instructions for locating a point on a hash ring structure based on the bucket identifier of the bucket to which the user associated with the request is assigned, in response to the request;
instructions or identifying a segment of the hash ring structure that the point belongs to, the segment of the hash ring structure representing a server of a server cluster; and
instructions for sending the request to the server represented by the segment of the hash ring structure, wherein requests from the user and the other users that are assigned to the same bucket are sent to the same server to improve a cache hit rate.

9. The medium of claim 8, wherein the server improves the cache hit rate by fulfilling the request from the user using cached elements of other users assigned to the same bucket as the user.

10. The medium of claim 8, further comprising:
instructions for extracting, from the request, the user identifier of the user associated with the request to determine the bucket identifier of the bucket to which the user is assigned.

11. The medium of claim 8, wherein the instructions for locating a point on a hash ring structure comprises:
instructions for computing a hash of the bucket identifier of the bucket using a hash function; and
instructions for using the hash of the bucket identifier to locate the point on the hash ring structure.

12. The medium of claim 8, wherein the hash ring structure is a consistent hash ring including multiple segments representing multiple servers of the server cluster.

13. The medium of claim 8, wherein remaining users with who the user shares the social attribute are assigned to another bucket.

14. A system, comprising:
a hardware traffic routing server;
a memory; and
multiple server clusters coupled to the hardware traffic routing server, each server cluster having a set of cache servers for storing cached data;
wherein the hardware traffic routing server is configured to perform a process including:
receiving a request from a user, the user being assigned to a bucket, wherein multiple users including the user have a common social attribute and are assigned to the bucket;
in response to the request, locating a point on a hash ring structure based on a bucket identifier of the bucket to which the user associated with the request is assigned, wherein the bucket identifier is determined based on a user identifier of the user received in the request;
identifying a segment of the hash ring structure that the point belongs to, the segment of the hash ring structure representing a server cluster among the multiple server clusters; and
sending the request to the server represented by the segment of the hash ring structure, wherein requests from at least some of the multiple users assigned to the bucket are sent to the same server cluster.

15. The system of claim 14, further comprising:
a datastore configured to store a mapping between user identifiers and bucket identifiers of buckets to which users of the system are assigned, wherein the user and at least some of other users with whom the user shares the common social attribute are assigned to the same bucket.

16. The system of claim 14, wherein the hardware traffic routing server is further configured to:
extract, from the request, the user identifier of the user; and
retrieve, from the datastore, the bucket identifier corresponding to the user identifier of the user.

17. The system of claim 14, wherein the hardware traffic routing server uses the hash ring structure to identify the server cluster from the multiple server clusters, wherein the hash ring structure is a consistent hash ring including multiple segments representing the multiple server clusters.

18. The system of claim 14, wherein the hardware traffic routing server is further configured to:
   compute a hash of the bucket identifier using a hash function; and
   wherein the locating a point on a hash ring structure comprises: locating a point on a hash ring structure based on the hash of the bucket identifier.

19. The system of claim 14, wherein the hardware traffic routing server is configured to route requests from the multiple users to one or more of the multiple server clusters according to load constraints.

20. The method of claim 2, further comprising in response to a signal indicating network traffic needs to be rebalanced, migrating the multiple users assigned the bucket from the server or the server cluster to another server or another server cluster, by assigning a new bucket identifier to the bucket so that a new hash value of the new bucket identifier corresponds to a point in another segment of the hash ring structure that represents the other server or the other server cluster.

* * * * *